United States Patent
Wu

(10) Patent No.: US 11,165,985 B1
(45) Date of Patent: Nov. 2, 2021

(54) CIRCUITRY AND METHOD FOR DETECTING AUDIO STANDARD OF SOUND INTERMEDIATE FREQUENCY SIGNAL

(71) Applicant: Realtek Semiconductor Corp., HsinChu (TW)

(72) Inventor: Chia-Che Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/233,532

(22) Filed: Apr. 18, 2021

(30) Foreign Application Priority Data

May 22, 2020 (TW) ................................. 109117053

(51) Int. Cl.
*H04N 5/60* (2006.01)
*H04N 5/455* (2006.01)
*H04N 21/233* (2011.01)

(52) U.S. Cl.
CPC ............. *H04N 5/60* (2013.01); *H04N 5/455* (2013.01); *H04N 21/233* (2013.01)

(58) Field of Classification Search
CPC ...... H04N 21/233; H04N 5/605; H04N 5/602; H04N 5/60; H04N 5/455; H04N 5/44
USPC ................................ 348/738, 725–728, 736
See application file for complete search history.

(56) References Cited

U.S. PATENT DOCUMENTS

| 4,139,866 A * | 2/1979 | Wegner | H04N 7/06 348/738 |
| 2006/0232868 A1 | 10/2006 | Wu | |
| 2009/0190656 A1 | 7/2009 | Baer | |
| 2012/0194739 A1 * | 8/2012 | Yang | H04N 5/46 348/555 |

* cited by examiner

*Primary Examiner* — Sherrie Hsia
(74) *Attorney, Agent, or Firm* — Winston Hsu

(57) ABSTRACT

Circuitry for detecting an audio standard of a sound intermediate frequency signal includes an intermediate frequency to baseband circuit, a detection circuit and a demodulator/decoder. The intermediate frequency to baseband circuit is configured to process the sound intermediate frequency signal to generate a main tone and a sub-tone. The detection circuit is configured to determine if the sound intermediate frequency signal belongs to a first standard or a second standard according to if the sub-tone has a pilot signal or a digital frame, to generate a detection result. The demodulator/decoder is configured to demodulate/decode at least the main tone to generate an output audio signal.

18 Claims, 3 Drawing Sheets

CIRCUITRY AND METHOD FOR DETECTING AUDIO STANDARD OF SOUND INTERMEDIATE FREQUENCY SIGNAL

BACKGROUND OF THE INVENTION

1. Field of the Invention

The present invention relates to circuitry for detecting an audio standard and a method thereof, and more particularly, to circuitry for detecting an audio standard of a sound intermediate frequency signal and a method thereof.

2. Description of the Prior Art

In analog TV systems, there are several audio standards, including a frequency modulation monaural (FM-MONO) standard, a Near Instantaneous Companded Audio Multiplex (NICAM) standard, an A2 standard, a Broadcast Television Systems Committee (BTSC) standard, an amplitude modulation monaural (AM-MONO), etc. The traditional method detects the audio standard of a sound intermediate frequency signal by detecting signal strength of the sound intermediate frequency signal at different frequencies. However, since the sound intermediate frequency signal is easily affected by noise, taking the signal strength of the sound intermediate frequency signal as the criterion for determining the audio standard is prone to error, which will affect subsequent decoding and/or demodulating operations.

SUMMARY OF THE INVENTION

One of the objectives of the present invention is to provide circuitry and a method for detecting an audio standard of a sound intermediate frequency signal accurately, to solve the aforementioned problem.

At least one embodiment of the present invention provides circuitry for detecting an audio standard of a sound intermediate frequency signal. The circuitry comprises an intermediate frequency to baseband circuit, a detection circuit and a demodulator/decoder. The intermediate frequency to baseband circuit is configured to process the sound intermediate frequency signal to generate a main tone and a sub-tone. The detection circuit is configured to determine if the sound intermediate frequency signal belongs to a first standard or a second standard according to if the sub-tone has a pilot signal or a digital frame, to generate a detection result. The demodulator/decoder is coupled to the intermediate frequency to baseband circuit and the detection circuit. The demodulator/decoder is configured to demodulate/decode at least the main tone according to the detection result, to generate an output audio signal.

At least one embodiment of the present invention provides a method for detecting an audio standard of a sound intermediate frequency signal. The method may comprise: processing the sound intermediate frequency signal to generate a main tone and a sub-tone; determining if the sound intermediate frequency signal belongs to a first standard or a second standard according to if the sub-tone has a pilot signal or a digital frame, to generate a detection result; and demodulating/decoding at least the main tone according to the detection result, to generate an output audio signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
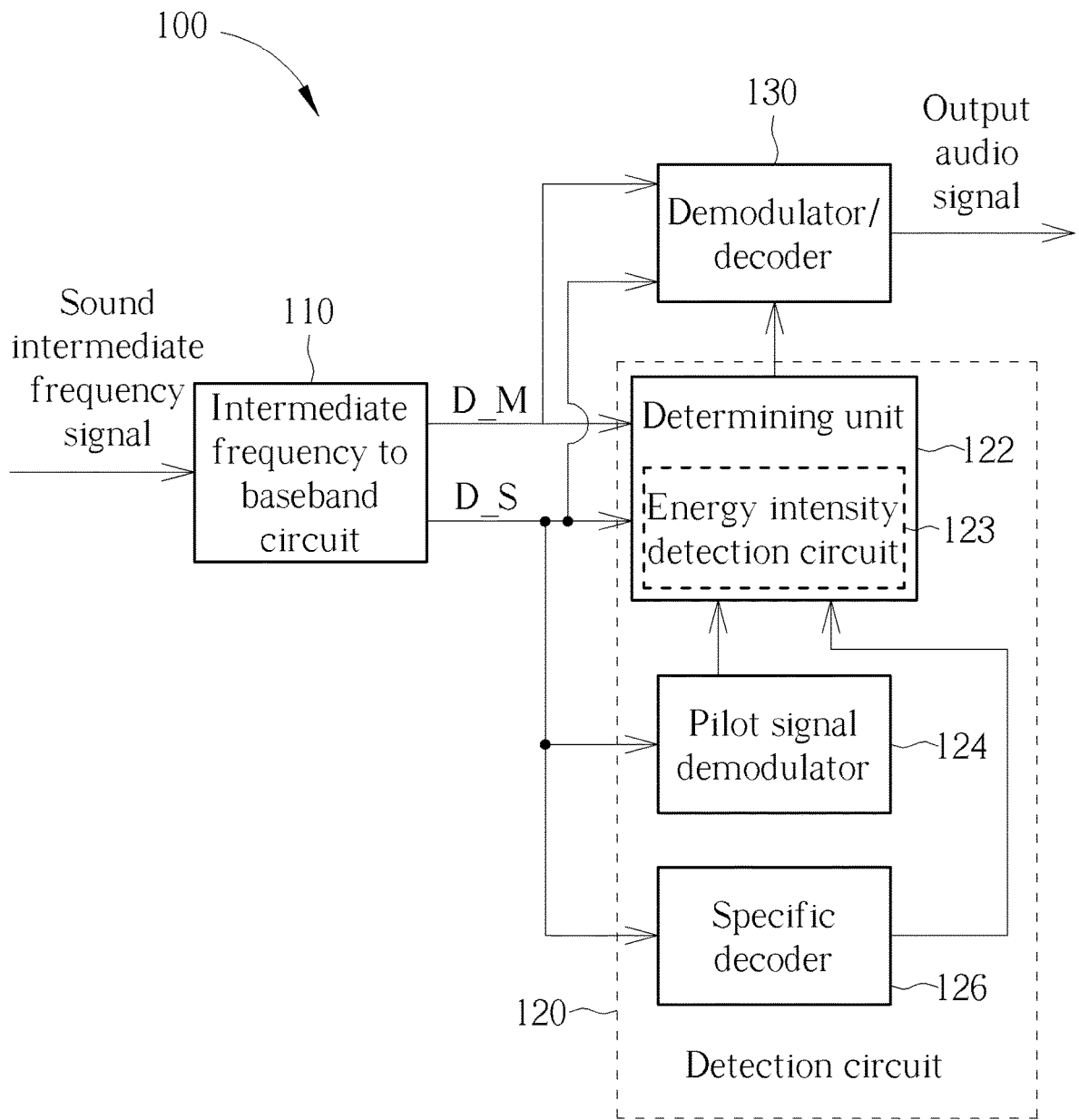
FIG. 1 is a diagram illustrating circuitry for detecting an audio standard of a sound intermediate frequency signal according to an embodiment of the present invention.
Figure 2:
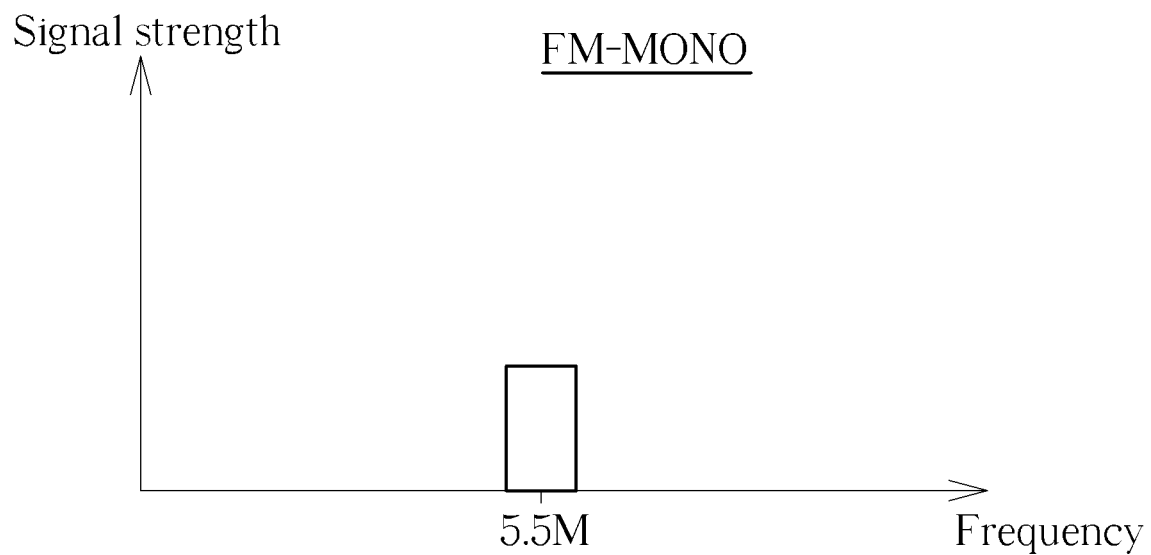
FIG. 2 is a diagram illustrating a sound intermediate frequency signal having an FM-MONO standard in the B, G system according to an embodiment of the present invention.
Figure 3:
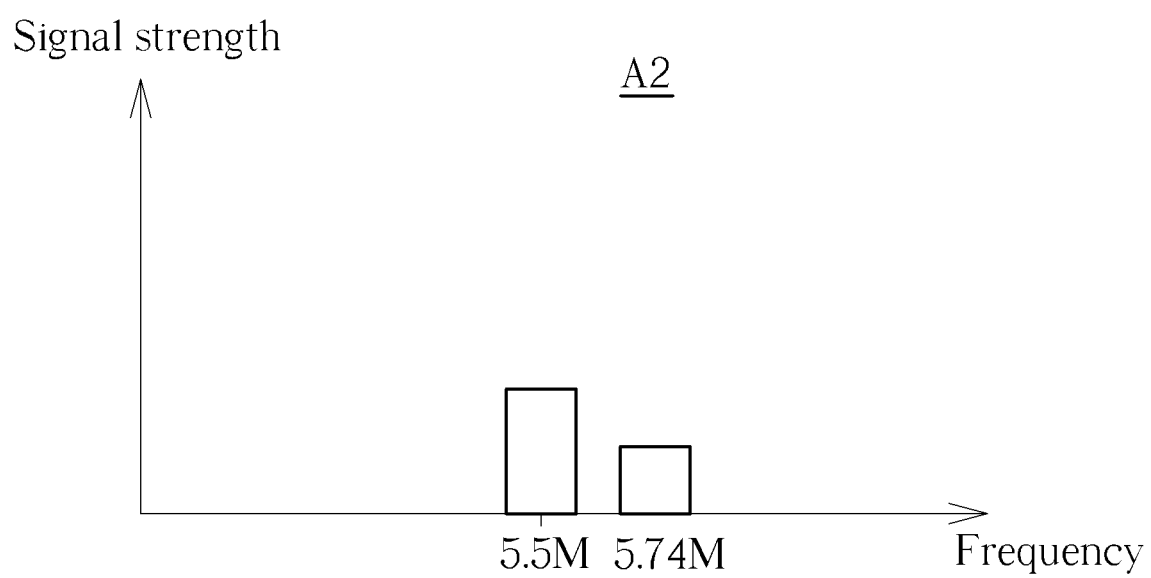
FIG. 3 is a diagram illustrating a sound intermediate frequency signal having an A2 standard in the B, G system according to an embodiment of the present invention.
Figure 4:
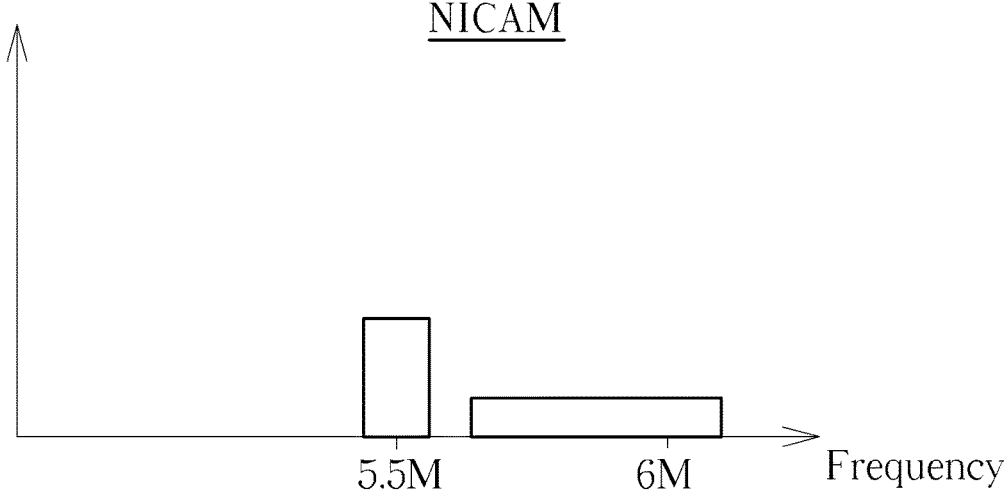
FIG. 4 is a diagram illustrating a sound intermediate frequency signal having a NICAM standard in the B, G system according to an embodiment of the present invention.

FIG. 1 is a diagram illustrating circuitry 100 for detecting an audio standard of a sound intermediate frequency signal according to an embodiment of the present invention. As shown in FIG. 1, the circuitry 100 comprises an intermediate frequency to baseband circuit 110, a detection circuit 120 and a demodulator/decoder 130. The demodulator/decoder 130 may comprise a demodulator and a decoder for demodulating and/or decoding signal. The detection circuit 120 comprises a determining unit 122, a pilot signal demodulator 124 and a specific decoder 126, and the determining unit 122 comprises an energy intensity detection circuit 123. In the present embodiment, the circuitry 100 is applied to an analog TV system, and the circuitry 100 may be configured to detect if a received sound intermediate frequency signal belongs to an FM-MONO standard, an A2 standard or a NICAM standard. FIG. 2 is a diagram illustrating a sound intermediate frequency signal having an FM-MONO standard in the B, G system according to an embodiment of the present invention. The sound intermediate frequency signal only has a main tone, and a center frequency of the main tone is 5.5 MHz and the bandwidth is about 100 kHz. FIG. 3 is a diagram illustrating a sound intermediate frequency signal having an A2 standard in the B, G system according to an embodiment of the present invention. The sound intermediate frequency signal has a main tone and a sub-tone. A center frequency of the main tone with higher intensity is 5.5 MHz and the bandwidth is about 100 kHz. A center frequency of the sub-tone with lower intensity is 5.74 MHz and the bandwidth is about 100 kHz. FIG. 4 is a diagram illustrating a sound intermediate frequency signal having a NICAM standard in the B, G system according to an embodiment of the present invention. The sound intermediate frequency signal has a main tone and a sub-tone. A center frequency of the main tone with higher intensity is 5.5 MHz and the bandwidth is about 100 kHz. A bandwidth of the sub-tone with lower intensity is about 510 kHz. It should be noted that the content of FIG. 2-4 is only for the convenience of subsequent descriptions, and is not meant to be a limitation of the present invention. In some other systems, such as DK system and I system, a main tone and a sub-tone thereto will have different center frequencies.

In the operation of the circuitry 100, the intermediate frequency to baseband circuit 110 receives the sound intermediate frequency signal, and down-converts the sound intermediate frequency signal to a base band to generate a main tone D_M and a sub-tone D_S. In the present embodiment, the main tone D_M corresponds to a signal content with a center frequency of 5.5 MHz and a bandwidth of about 100 kHz in FIGS. 2-4. The sub-tone D_S may correspond to a signal content with a center frequency of 5.74 MHz and a bandwidth of about 100 kHz in FIG. 3, or a signal content with a bandwidth of about 510 kHz in FIG. 4. It should be noted that the sub-tone D_S at this moment may not have valid content. For example, under a circumstance of the FM-MONO standard, there is no substantial content carried by the sub-tone D_S. Then, the detection circuit 120 detects the main tone D_M and the sub-tone D_S to determine whether the sound intermediate frequency signal belongs to the FM-MONO standard, the A2 standard or the NICAM standard. Specifically, since the main tone has higher energy intensity and the sub-tone has lower energy intensity in the standards shown in FIGS. 2-4, the energy intensity detection circuit 123 is able to determine if the sound intermediate frequency signal may belong to any standard in FIGS. 2-4, through detecting if the power/intensity of the main tone D_M generated from the intermediate frequency to baseband circuit 110 is greater than a first threshold value. In addition, the energy intensity detection circuit 123 is also able to determine if the sound intermediate frequency signal may belong to any standard in FIGS. 2-4, through detecting if the power/intensity of the sub-tone D_S generated from the intermediate frequency to baseband circuit 110 is greater than a second threshold value. However, a detection result of the energy intensity detection circuit 123 may have errors due to the influence of noise. Therefore, the present embodiment may further use the pilot signal demodulator 124 and the specific decoder 126 to accurately determine which standard in FIGS. 2-4 that the sound intermediate frequency signal belongs to.

The pilot signal demodulator 124 is used especially for demodulating the sub-tone D_S to determine if the sub-tone D_S has a pilot signal, to thereby determine if the sound intermediate frequency signal belongs to the A2 standard. Specifically, in the A2 standard in FIG. 3, the sub-tone comprises messages in stereo sound, two-channel audio or other audio mode, and the frequency-modulated sub-tone will additionally include an amplitude-modulated pilot signal. Therefore, a result generated from the pilot signal demodulator 124, such as a result indicating if the sub-tone D_S comprises the pilot signal, can be used to determine if the sound intermediate frequency signal belongs to the A2 standard.

The specific decoder 126 may be a NICAM standard decoder configured to perform content decode on the sub-tone D_S, in order to determine if the sub-tone D_S has a digital frame for determining if the sound intermediate frequency signal belongs to the NICAM standard. Specifically, in the NICAM standard in FIG. 4, the sub-tone comprises the digital frame with a size of 728 bits, and the digital frame comprises an 8-bit Frame Alignment Word (FAW), a 5-bit control code, 11-bit extra data and channel data (which consists of 64*11 bits). Therefore, the specific decoder 126 is able to determine if the sub-tone D_S comprises the digital frame through decoding the sub-tone D_S and detecting existence of the FAW. As described above, a result generated from the specific decoder 126, such as a result indicating if the sub-tone D_S comprises the digital frame, can be used to determine if the sound intermediate frequency signal belongs to the NICAM standard.

In the present embodiment, the detection circuit 120 determines if the sound intermediate frequency signal belongs to the FM-MONO standard, the A2 standard or the NICAM standard by checking if the sub-tone has the pilot signal or the digital frame and referring to the signal strength of the main tone D_M and the sub-tone D_S, to generate a detection result. In detail, the determining unit 122 is able to determine if the sound intermediate frequency signal belongs to the FM-MONO standard, the A2 standard or the NICAM standard according to the results output from the energy intensity detection circuit 123, the pilot signal demodulator 124 and the specific decoder 126. Specifically, if the energy intensity detection circuit 123 determines that the power/intensity of the main tone D_M generated from the intermediate frequency to baseband circuit 110 is greater than a first threshold value and the result generated from the pilot signal demodulator 124 shows that the sub-tone D_S does not have the pilot signal and the result generated from the specific decoder 126 shows that the sub-tone D_S does not have the digital frame, the determining unit 122 may determine that the sound intermediate frequency signal belongs to the FM-MONO standard; if the energy intensity detection circuit 123 determines that the power/intensity of the sub-tone D_S generated from the intermediate frequency to baseband circuit 110 is greater than a second threshold value and the result generated from the pilot signal demodulator 124 shows that the sub-tone D_S has the pilot signal, the determining unit 122 may determine that the sound intermediate frequency signal belongs to the A2 standard; if the energy intensity detection circuit 123 determines that the power/intensity of the sub-tone D_S generated from the intermediate frequency to baseband circuit 110 is greater than the second threshold value and the result generated from the specific decoder 126 shows that the sub-tone D_S has the digital frame, the determining unit 122 may determine that the sound intermediate frequency signal belongs to the NICAM standard.

The determining unit 122 transmits the determined result to the demodulator/decoder 130 to set corresponding settings of the demodulator/decoder 130 for demodulating and/or decoding the main tone D_M and the sub-tone D_S, to generate an output audio signal. The output audio signal may be a stereo Pulse-Code Modulation (PCM) signal. It should be understood that, when the determining unit 122 determines that the sound intermediate frequency signal belongs to FM-MONO standard, due to the fact that the sound intermediate frequency signal does not have substantial content of the sub-tone, the demodulator/decoder 130 only demodulates and/or decodes the main tone D_M to generate the output audio signal; and when the determining unit 122 determines that the sound intermediate frequency signal belongs to the A2 standard or the NICAM standard, the demodulator/decoder 130 demodulates and/or decodes both of the main tone D_M and the sub-tone D_S to generate the output audio signal.

In above embodiments, the pilot signal demodulator 124 and specific decoder 126 are independent of the demodulator/decoder 130. That is to say the sub-tone D_S is first demodulated and decoded to determine if the sub-tone D_S belongs to the A2 standard or the NICAM standard, and then the demodulator/decoder 130 is controlled to perform appropriate operations. Since the detection circuit 120 of the present embodiment can accurately determine the standard of the sound intermediate frequency signal, errors in the overall operation of the circuitry 100 can be avoided.

In an embodiment in FIG. 1, the standard of the sound intermediate frequency signal is determined by jointly taking into account the detection results of the main tone D_M and the sub-tone D_S generated from the energy intensity detection circuit 123. The present invention is not limited thereto, however. For example, if the result generated from pilot signal demodulator 124 shows that the sub-tone D_S has the pilot signal, the determining unit 122 may directly determine that the sound intermediate frequency signal belongs to the A2 standard. For another example, if the result generated from the specific decoder 126 shows that the sub-tone D_S has the digital frame, the determining unit 122 may directly determine that the sound intermediate frequency signal belongs to the NICAM standard. These alternative designs all belong to the scope of the present invention.

In another embodiment in FIG. 1, the pilot signal demodulator 124 of the detection circuit 120 is configured to accurately determine if the sound intermediate frequency signal is in compliance with the A2 standard and the specific decoder 126 is configured to accurately determine if the sound intermediate frequency signal is in compliance with the NICAM standard. In another embodiment, the detection circuit 120 may comprise the pilot signal demodulator 124 only, in order to only determine if the sound intermediate frequency signal is in compliance with the A2 standard, and the determination of the NICAM standard can be performed through the energy intensity detection circuit 123. For example, if the energy intensity detection circuit 123 determines that the power/intensity of the sub-tone D_S generated from the intermediate frequency to baseband circuit 110 is greater than the second threshold value but the result of the pilot signal demodulator 124 shows that the sub-tone D_S does not have the pilot signal, the determining unit 122 may determine that the sound intermediate frequency signal belongs to the NICAM standard. In another embodiment, the detection circuit 120 may comprise the specific decoder 126 only, in order to only determine if the sound intermediate frequency signal is in compliance with the NICAM standard, and the determination of the A2 standard can be performed through the energy intensity detection circuit 123. For example, if the energy intensity detection circuit 123 determines that the power/intensity of the sub-tone D_S generated from the intermediate frequency to baseband circuit 110 is greater than the second threshold value but the result of the specific decoder 126 shows that the sub-tone D_S does not have the digital frame, the determining unit 122 may determine that the sound intermediate frequency signal belongs to the A2 standard.

Figure 5:
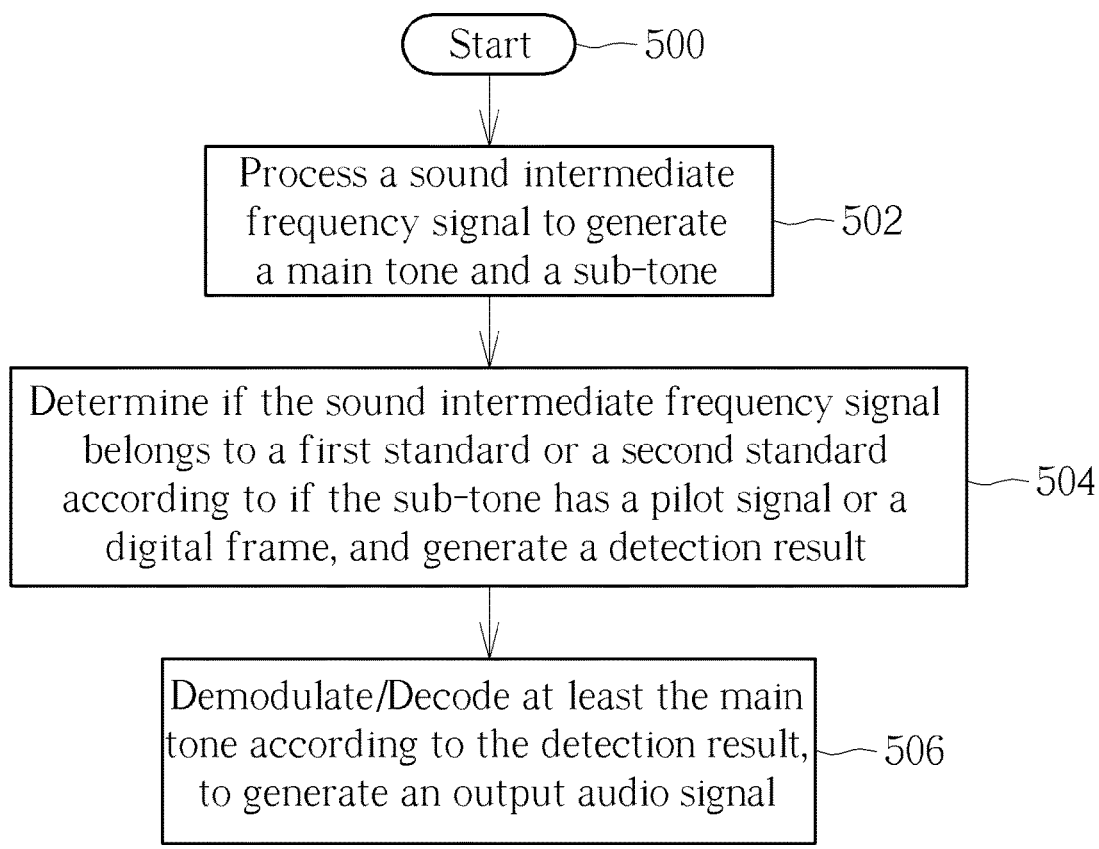
FIG. 5 is a flowchart illustrating a method for detecting an audio standard of a sound intermediate frequency signal according to an embodiment of the present invention.

FIG. 5 is a flowchart illustrating a method for detecting an audio standard of a sound intermediate frequency signal according to an embodiment of the present invention. Referring to the description above, the method of the present invention comprises the following steps:

Step 500: Start the flow;

Step 502: Process a sound intermediate frequency signal to generate a main tone and a sub-tone;

Step 504: Determine if the sound intermediate frequency signal belongs to a first standard or a second standard according to if the sub-tone has a pilot signal or a digital frame, and generate a detection result; and Step 506: Demodulate/Decode at least the main tone according to the detection result, to generate an output audio signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. Circuitry for detecting an audio standard of a sound intermediate frequency signal, comprising:
    an intermediate frequency to baseband circuit, configured to process the sound intermediate frequency signal to generate a main tone and a sub-tone;
    a detection circuit, configured to determine if the sound intermediate frequency signal belongs to a first standard or a second standard according to if the sub-tone has a pilot signal or a digital frame, to generate a detection result; and
    a demodulator/decoder, coupled to the intermediate frequency to baseband circuit and the detection circuit, the demodulator/decoder being configured to demodulate/decode at least the main tone according to the detection result, to generate an output audio signal.

2. The circuitry of claim 1, wherein the detection circuit comprises:
    a pilot signal demodulator, configured to demodulate the sub-tone to generate a demodulated signal;
    a specific decoder, configured to decode the sub-tone to generate a decoded signal; and
    a determining unit, configured to determine if the sound intermediate frequency signal belongs to the first standard or the second standard according to if the demodulated signal has the pilot signal and if the decoded signal has the digital frame, to generate the detection result.

3. The circuitry of claim 2, wherein if the demodulated signal has the pilot signal, the determining unit determines that the sound intermediate frequency signal belongs to the first standard; and if the demodulated signal has the digital frame, the determining unit determines that the sound intermediate frequency signal belongs to the second standard.

4. The circuitry of claim 1, wherein the detection circuit determines that the sound intermediate frequency signal belongs to the first standard, the second standard or a third standard by checking if the sub-tone has the pilot signal or the digital frame and referring to a signal strength of the main tone and the sub-tone, to generate the detection result; wherein the third standard is different from the first standard and the second standard.

5. The circuitry of claim 4, wherein the first standard is an A2 standard, the second standard is a Near Instantaneous Companded Audio Multiplex (NICAM) standard, and the third standard is a frequency modulation monaural (FM-MONO) standard.

6. The circuitry of claim 1, wherein the detection circuit comprises:
    a pilot signal demodulator, configured to demodulate the sub-tone to generate a demodulated signal; and
    a determining unit, configured to determine if the sound intermediate frequency signal belongs to the first standard or the second standard by checking if the demodulated signal has the pilot signal and referring to a signal strength of the sub-tone, to generate the detection result.

7. The circuitry of claim 6, wherein if the demodulated signal has the pilot signal, the determining unit determines that the sound intermediate frequency signal belongs to the A2 standard; and if the demodulated signal does not have the pilot signal and the signal strength of the sub-tone is greater than a threshold value, the determining unit determines that the sound intermediate frequency signal belongs to the NICAM standard.

8. The circuitry of claim 1, wherein the detection circuit comprises:

a specific decoder, configured to decode the sub-tone to generate a decoded signal; and a determining unit, configured to determine if the sound intermediate frequency signal belongs to the first standard or the second standard by checking if the decoded signal has the digital frame and referring to the signal strength of the sub-tone, to generate the detection result.

9. The circuitry of claim 8, wherein if the decoded signal has the digital frame, the determining unit determines that the sound intermediate frequency signal belongs to the NICAM standard; and if the decoded signal does not have the digital frame and the signal strength of the sub-tone is greater than a threshold value, the determining unit determines that the sound intermediate frequency signal belongs to the A2 standard.

10. A method for detecting an audio standard of a sound intermediate frequency signal, comprising:

processing the sound intermediate frequency signal to generate a main tone and a sub-tone;

determining if the sound intermediate frequency signal belongs to a first standard or a second standard according to if the sub-tone has a pilot signal or a digital frame, to generate a detection result; and demodulating/decoding at least the main tone according to the detection result, to generate an output audio signal.

11. The method of claim 10, wherein determining if the sound intermediate frequency signal belongs to the first standard or the second standard comprises:

demodulating the sub-tone to generate a demodulated signal;

decoding the sub-tone to generate a decoded signal; and determining if the sound intermediate frequency signal belongs to the first standard or the second standard according to if the demodulated signal has the pilot signal or the decoded signal has the digital frame, and generating the detection result.

12. The method of claim 11, wherein generating the detection result comprises:

if the demodulated signal has the pilot signal, determining that the sound intermediate frequency signal belongs to the first standard; and if the demodulated signal has the digital frame, determining that the sound intermediate frequency signal belongs to the second standard.

13. The method of claim 10, wherein determining if the sound intermediate frequency signal belongs to the first standard or the second standard comprises:

determining if the sound intermediate frequency signal belongs to the first standard, the second standard or a third standard by checking if the sub-tone has the pilot signal or the digital frame and referring to a signal strength of the main tone and the sub-tone, to generate the detection result; wherein the third standard is different from the first standard and the second standard.

14. The method of claim 13, wherein the first standard is an A2 standard, the second standard is a Near Instantaneous Companded Audio Multiplex (NICAM) standard, and the third standard is a frequency modulated monaural standard.

15. The method of claim 10, wherein determining if the sound intermediate frequency signal belongs to the first standard or the second standard comprises:

demodulating the sub-tone to generate a demodulated signal; and determining if the sound intermediate frequency signal belongs to the first standard or the second standard by checking if the demodulated signal has the pilot signal and referring to a signal strength of the sub-tone, and generating the detection result.

16. The method of claim 15, wherein generating the detection result comprises:

if the demodulated signal has the pilot signal, determining that the sound intermediate frequency signal belongs to the A2 standard; and if the demodulated signal does not have the pilot signal and the signal strength of the sub-tone is greater than a threshold value, determining that the sound intermediate frequency signal belongs to the NICAM standard.

17. The method of claim 10, wherein determining if the sound intermediate frequency signal belongs to the first standard or the second standard comprises:

decoding the sub-tone to generate a decoded signal; and determining if the sound intermediate frequency signal belongs to the first standard or the second standard by checking if the decoded signal has the digital frame and referring to the signal strength of the sub-tone, and generating the detection result.

18. The method of claim 17, wherein generating the detection result comprises:

if the decoded signal has the digital frame, determining that the sound intermediate frequency signal belongs to the NICAM standard; and if the decoded signal does not have the digital frame and the signal strength of the sub-tone is greater than a threshold value, determining that the sound intermediate frequency signal belongs to the A2 standard.

* * * * *